(12) United States Patent
Kari (10) Patent No.: US 9,681,035 B2
(45) Date of Patent: Jun. 13, 2017

(54) METHOD AND APPARATUS FOR EXTERNAL CONTROL OF A MOBILE DEVICE USING AN ELECTROMAGNETIC SIGNAL INDEPENDENTLY OF WHETHER THE SIGNAL IS COMPLIANT WITH PROXIMITY COMMUNICATIONS SUPPORTED BY THE MOBILE DEVICE

(71) Applicant: Nokia Technologies Oy, Espoo (FI)

(72) Inventor: Juhani Kari, Lieto (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/651,437

(22) PCT Filed: Dec. 13, 2012

(86) PCT No.: PCT/FI2012/051240
§ 371 (c)(1),
(2) Date: Jun. 11, 2015

(87) PCT Pub. No.: WO2014/091059
PCT Pub. Date: Jun. 19, 2014

(65) Prior Publication Data
US 2015/0326773 A1    Nov. 12, 2015

(51) Int. Cl.
*H04N 5/232* (2006.01)
*H04B 5/00* (2006.01)
(Continued)

(52) U.S. Cl.
CPC ....... *H04N 5/23203* (2013.01); *H04B 5/0031* (2013.01); *H04M 1/0264* (2013.01);
(Continued)

(58) Field of Classification Search
None
See application file for complete search history.

(56) References Cited

U.S. PATENT DOCUMENTS

| 8,244,299 | B1 | 8/2012 | Bishop |
| 2003/0179306 | A1 | 9/2003 | Lee |

(Continued)

FOREIGN PATENT DOCUMENTS

| CN | 101826895 A | 9/2010 |
| JP | 2004-274511 A | 9/2004 |

(Continued)

OTHER PUBLICATIONS

International Search Report and Written Opinion received for corresponding Patent Cooperation Treaty Application No. PCT/FI2012/051240, dated Sep. 19, 2013, 14 pages.

(Continued)

*Primary Examiner* — Shahbaz Nazrul
(74) *Attorney, Agent, or Firm* — Locke Lord LLP (57) ABSTRACT

A method and apparatus (100) are disclosed for wirelessly communicating by a proximity communication circuitry comprising an antenna with a proximate device (200) according to a proximity communication protocol. The proximity circuitry is disabled when not needed. Voltage in the antenna caused by an electromagnetic power signal (222) is detected when the proximity communication circuitry is disabled. The detection of voltage is independent of whether the electromagnetic signal (222) complies with the proximity communication protocol. An event is triggered in response to the detected voltage. Correspondingly a method and device (200) for externally controlling the apparatus (100) are disclosed in which a user command is detected and responsively to the user command, an electromagnetic signal (222) is transmitted to the apparatus (100) for triggering the event. The electromagnetic signal (222) has a regular wave form.

21 Claims, 4 Drawing Sheets

(51) Int. Cl.
*H04M 1/02* (2006.01)
*H04M 1/725* (2006.01)
*H04W 52/02* (2009.01)
*H04M 1/04* (2006.01)

(52) U.S. Cl.
CPC ... *H04M 1/72527* (2013.01); *H04W 52/0274* (2013.01); *H04B 5/0075* (2013.01); *H04M 1/04* (2013.01); *Y02B 60/50* (2013.01)

(56) References Cited

U.S. PATENT DOCUMENTS

| | | |
|---|---|---|
| 2004/0203352 A1 | 10/2004 | Hall et al. |
| 2005/0249486 A1 | 11/2005 | Murray |
| 2006/0049825 A1* | 3/2006 | Habara .............. G01R 33/3621 324/207.2 |
| 2006/0079180 A1 | 4/2006 | Sinivaara |
| 2006/0085579 A1* | 4/2006 | Sato ........................ G08C 17/02 710/73 |
| 2007/0025711 A1* | 2/2007 | Marcus .................. G03B 17/38 396/56 |
| 2007/0238484 A1 | 10/2007 | Liu |
| 2007/0279511 A1* | 12/2007 | Misawa .............. H04N 5/2251 348/333.06 |
| 2008/0143487 A1 | 6/2008 | Hulvey |
| 2008/0240697 A1 | 10/2008 | Marcus |
| 2009/0221240 A1 | 9/2009 | Zhang |
| 2010/0060747 A1* | 3/2010 | Woodman .............. G03B 17/02 348/222.1 |
| 2010/0178866 A1* | 7/2010 | Jalkanen .............. G06K 7/0008 455/41.1 |
| 2011/0250839 A1 | 10/2011 | Lee |
| 2012/0188052 A1 | 7/2012 | Rosenblatt et al. |
| 2012/0270599 A1 | 10/2012 | Mori et al. |
| 2012/0282977 A1* | 11/2012 | Haleluk ............... H04B 1/3888 455/556.1 |
| 2014/0259061 A1* | 9/2014 | Delpuch ................ H04L 69/08 725/37 |

FOREIGN PATENT DOCUMENTS

| | | |
|---|---|---|
| JP | 2011-066495 A | 3/2011 |
| WO | 2012/058724 A1 | 5/2012 |

OTHER PUBLICATIONS

"Sony Spruces Up Xperia Line With a SmartWatch and NFC SmartTags", Whats Tour Tech.Ca Canada Plugged In, Retrieved on Jun. 21, 2016, Webpage available at : http://whatsyourtech.ca/2012/07/23/sony-spruces-up-xperia-line-with-a-smartwatch-and-nfc-smarttags/.

"CEATEC 2012: Sony Booth Overview", Sony Global, Retrieved on Jun. 18, 2016, Webpage available at : http://www.sony.net/SonyInfo/News/Press/201210/12-148E/.

Office action received for corresponding Chinese Patent Application No. 201280078156.0, dated Apr. 1, 2016, 8 pages of office action and no pages of office action translation available.

Office action received for corresponding Japanese Patent Application No. 2015-547096, dated Jul. 1, 2016, 3 pages of office action and no pages of office action translation available.

Extended European Search Report received for corresponding European Patent Application No. 12889831.9, dated Jul. 13, 2016, 7 pages.

\* cited by examiner

METHOD AND APPARATUS FOR EXTERNAL CONTROL OF A MOBILE DEVICE USING AN ELECTROMAGNETIC SIGNAL INDEPENDENTLY OF WHETHER THE SIGNAL IS COMPLIANT WITH PROXIMITY COMMUNICATIONS SUPPORTED BY THE MOBILE DEVICE

RELATED APPLICATION

This application was originally filed as PCT Application No. PCT/FI2012/051240 filed Dec. 13, 2012.

TECHNICAL FIELD

The present application generally relates to external control of a mobile device. In particular, though not exclusively, the present application relates to external control of a mobile device with a mechanically attached accessory device.

BACKGROUND

Mobile devices such as mobile telephones are typically equipped with camera units. Such mobile devices conveniently enable taking photographs almost anytime and anywhere, because mobile telephones are virtually always carried along by their users.

While mobile devices equipped with cameras are very common, their main purpose is yet normally something else than photographing. For portability, they are also made typically rather thin and light, which may hamper their camera use. Actual cameras are still built very much like their ancestors for tens of years even though the development of digital technology would allow also very different form factors. Camera reviews often emphasize natural grip at a right-hand side edge of the camera and positioning of most important buttons such as the shutter release next to fingers of the user on the grip. Such positioning in cameras is important not only for ergonomic reasons but also for reducing camera shake that adversely results in blurred images.

There are various accessories for mobile phones of one given brand that aim at improving the grip and shutter release position. Typically, such an accessory is attached to the mobile phone and connected to a proprietary docket connector so that shutter commands can be given to the camera unit of the mobile phone when the user depresses a conveniently located shutter release.

The present application aims at addressing particular problems of the existing solutions and/or at providing a new technical solution for external control of a mobile device.

SUMMARY

Various aspects of examples of the invention are set out in the claims.

According to a first example aspect of the present invention, there is provided an apparatus as defined in appended claim 1.

According to a second example aspect of the present invention, there is provided an device as defined in appended claim 10.

According to a third example aspect of the present invention, there is provided a method as defined in appended claim 14.

According to a fourth example aspect of the present invention, there is provided a method as defined in appended claim 17.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7 of the drawings.

Figure 1:
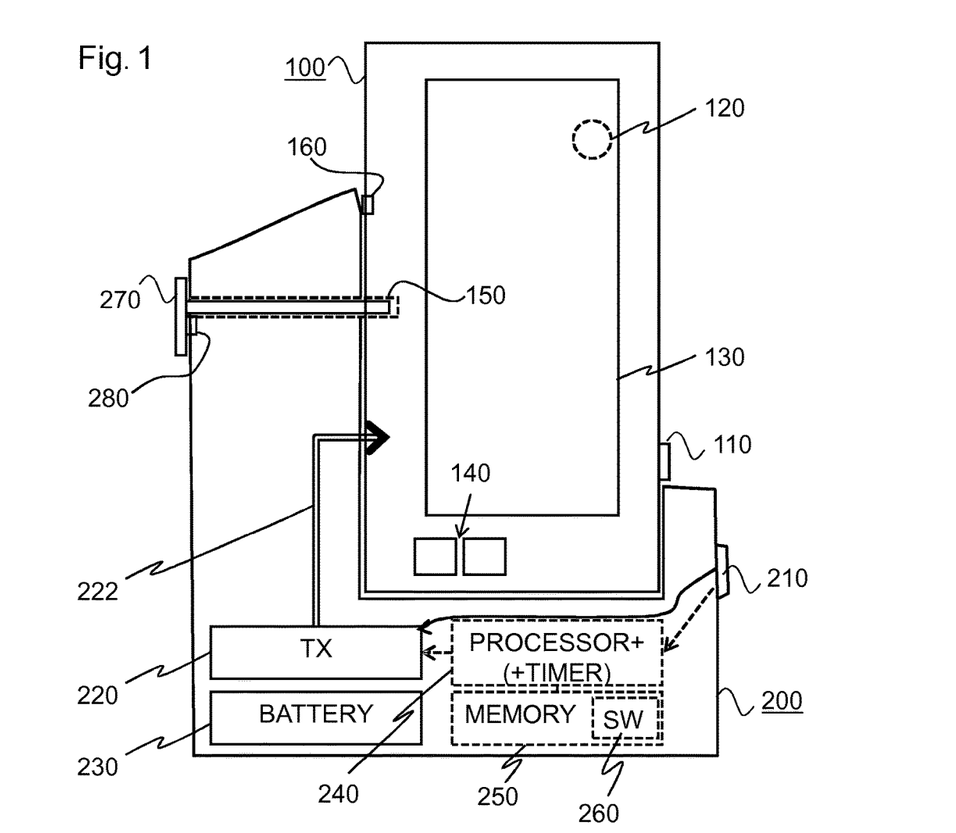
FIG. 1 shows an architectural overview of a system of an example embodiment of the invention.

FIG. 1 shows an architectural overview of a system of an example embodiment of the invention. The system comprises an apparatus 100 and a device 200. The apparatus 100 is, for example, a mobile apparatus such as a mobile phone, camera, personal digital assistant, game console, laptop computer, tablet computer or navigation device. In the following, a mobile phone is used as an example in sake of simplicity. The device 200 is, for example, an accessory device such as an add-on grip.

The apparatus 100 comprises a shutter release 110 and a camera unit 120 comprising: optics on a rear-surface when seen as in FIG. 1 and thus illustrated by dashed line; an auto-focus circuitry (not shown); processing circuitry (not shown); and software (not shown). The apparatus 100 further comprises in an example embodiment a display 130 such as a touch screen, a set of one or more buttons 140 and a screw thread 150 for receiving a camera mount screw. The apparatus 100 further comprises in an example embodiment a device sensor 160 that is configured to detect if the device 200 is attached to the apparatus 100. The device sensor 160 can be implemented e.g. using a reed sensor, micro switch, or circuit that is shorted by contacts in the device 100.

The device 200 comprises a user input 210 with one or more buttons configured to receive user indication of one or more different types. The device 200 further comprises a transmitter 220 configured to transmit an electromagnetic signal 222 configured to form a voltage into a proximate antenna of a proximity communications circuitry in the apparatus 100 (see FIG. 2). The device 200 further comprises a power supply such as a battery 230. The device 200 can be very simple, e.g. so constructed that the transmitter starts transmitting a constant wave signal when the user input 210 is actuated and to stop the transmitting when the actuation of the user input 210 ends. For enabling more sophisticated operations needed in some example embodiments, the device 200 can further comprise a processor 240, a memory 250 and software 260. Notice that while drawn separately, the processor and the memory can also be formed in a common circuitry such as an integrated circuitry. The same applies also with various other signal elements in this document: the elements may be freely combined or separated in two or more discrete elements if so desired. Not all the elements are always needed, either. For instance, the processor 240 can also operate as a timer or a separate timer can be provided. Moreover, a screw 270 can be provided for reliable attachment of the device 200 to the device 100. Alternatively, the device 200 can be provided with a snap-on attaching member, magnet, adhesive tape or form locking shape and member(s) for attaching to the device 100. The device 200 further comprises in one example embodiment an apparatus sensor 280 configured to sense when the device 200 is attached to the apparatus 100 and to responsively cause powering on the device 100.

Figure 2:
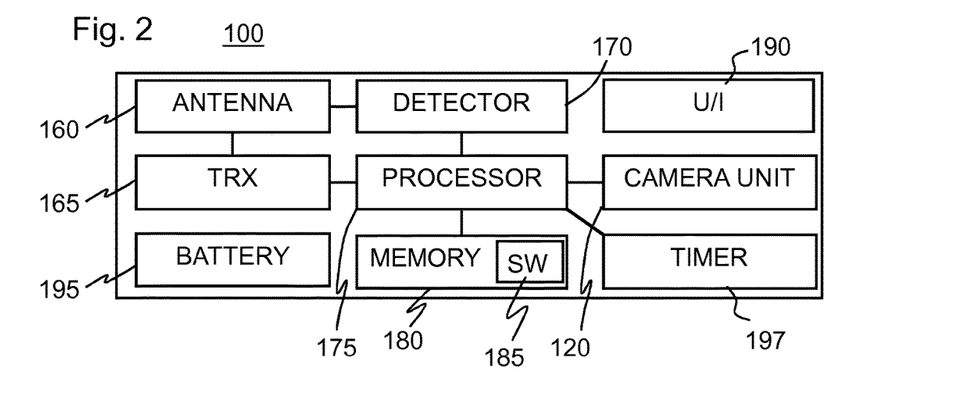
FIG. 2 shows a block diagram of some elements of an apparatus shown in FIG. 1, according to an example embodiment of the invention.

FIG. 2 shows a block diagram of some elements of the apparatus 100. The apparatus 100 comprises an antenna 160, a proximity communications transceiver 165, an antenna voltage detector 170, a processor 175, a memory 180, software 185, user interface 190 comprising e.g. the display 130, shutter release 110 and the one or more buttons 140. The apparatus 100 further comprises a power supply such as a battery 195 and a timer 197.

The proximity communications in this document refers to near field communication or radio frequency identification communication. The proximity communications transceiver 165 can be either active or passive device i.e. operate based on power received from the power supply 195 or based on power received from proximity communications signals. In this document, the antenna 160 of the proximity communications transceiver 165 can also be used with the detector 170 without actually using the transceiver 165. That is, the electromagnetic signal 222 causes a voltage in the antenna 160 regardless whether the transceiver is even switched on or not. As the matter of fact, the entire apparatus 100 can be switched off and still the electromagnetic signal 222 causes voltage in the antenna 160 or the detector 170 can bypass the proximity communications transceiver 165. The voltage caused in the antenna 160 depends on the amplitude of the received electromagnetic signal and on that how sensitive the antenna is at the frequency in which the electromagnetic signal 222 is received. In an example embodiment, the detector 170 is formed of such simple components that the voltage in the antenna 160 automatically causes that the detector to trigger an event. If the apparatus 100 is in a power off state, the event can be switching the power on. If the apparatus 100 is on, the event can be starting a camera application, switching on a camera unit or enabling the camera unit. In some example embodiments, the camera unit can be disabled by powering off some or all power-dependent components thereof. If the camera application is already running, and also otherwise in some example embodiments, the event can be taking a picture with the camera unit 120 or locking auto-focus of the camera unit. The commands for taking a picture and locking of the auto-focus are examples of commands that can normally be issued to the camera unit by a user directly using the apparatus 100 or using the device 200, when the device 200 and the apparatus 100 are configured to enable such operation.

Figure 4:
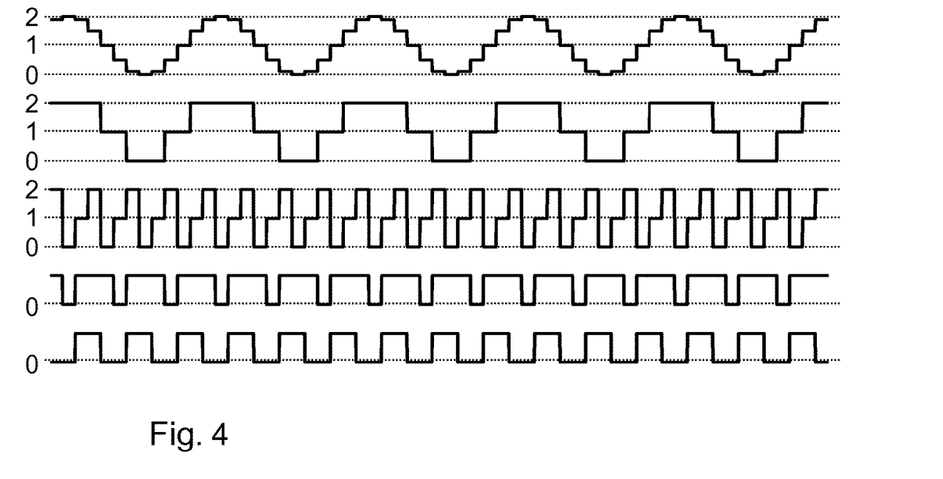
FIG. 4 shows some example sequences according to an example embodiment for authorizing transmission of commands.

The electromagnetic signal 222 need not be compliant with the proximity communications that the proximity communications transceiver 165 supports. This greatly reduces structural and functional requirements of the device 200. However, it is also possible that some electromagnetic noise could cause a voltage in the antenna 160 and subsequently lead into the triggering of the event when not desirable. To this end, different example embodiments provide for a) allowing a user of the apparatus to enable and disable the detector 170; b) providing a limited period (activation period, for example 5 minutes) of time during which the detector 170 is enabled and/or as of a command given with the user interface of 190; c) checking with the processor 175 whether a predetermined sequence is provided by the electromagnetic signal 222 and until then preventing the detector 170 from triggering events (e.g. events are triggered through the processor 175 that does not pass them unless the sequence has been detected); d) allowing by the processor 175 the detector 170 to trigger events during a predetermined activation period of time as of the detection of the sequence or of last detected electromagnetic signal detected during the activation period; e) receiving a voice command from the user of the apparatus 100; f) the detector 170 is disabled when the device sensor 160 does not detect the attaching of the device 200; or g) any combination thereof. For instance, the voice command can be simply any detectable utterance or a word recognized by speech recognition. Some example sequences are shown in FIG. 4.

Figure 3:
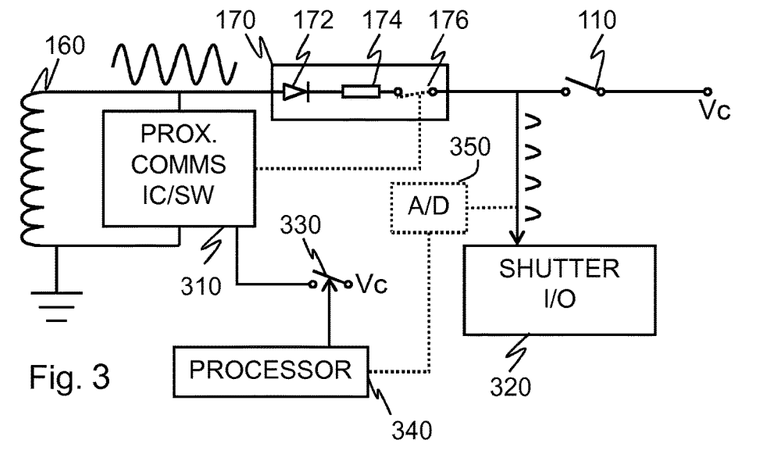
FIG. 3 shows a block diagram of some elements of the apparatus of an example embodiment of the invention.

Let us next consider the structure of the detector 170 using the example embodiment of FIG. 3. FIG. 3 shows also the antenna 160, the shutter release 110, a shutter input/output 320 of the camera circuitry and a proximity communications unit 310 that is e.g. an integrated circuit with suitable software. The detector 170 contains one diode 172, resistor 174 and a switch 176 controlled e.g. by the proximity communications unit 310. The diode 172 has two functions: first it practically prevents the shutter release 110 effecting on the antenna 160. Second, the diode 172 has a forward voltage i.e. the diode 172 drops the voltage e.g. by 0.7 V thus reducing likelihood that radio noise would cause false detection of the electromagnetic signal 222 (when not really present).

The detector 170 can be further provided with a comparator (not shown) or simply by a suitable resistor 174 so that only voltage exceeding a set threshold level causes the triggering of the event. In one example embodiment, the detector 170 comprises a transistor that is configured to operate as a controllable switch e.g. for triggering the shutter release command. The voltage level at which the detector 170 triggers can be adjusted e.g. using one or more resistors. For triggering different types of events or for detecting more than one particular voltage or range of voltages, the detector 170 comprises in one example embodiment two or more transistors e.g. for causing triggering signals to different outputs. The detector 170 can also be very simple, e.g. formed of one or two transistors and possibly of some passive components such as one or more resistors.

The apparatus 100 further comprises a power saving circuitry that for disabling the proximity communications unit 310 e.g. by switching off power supply. The power saving circuitry is formed in one example embodiment with a controllable switch 330 and with a control element such as a processor 340. In FIG. 3, also an analog to digital (A/D) converter 350 is communicatively connecting the output of the detector 170 to the processor 340 so that the processor 340 can detect output signals given by the detector 170. The processor 340 may but need not be controlling other functions of the apparatus 100. For example, the processor 340 can be formed in a common application specific integrated circuit with some or all logics of the proximity communications unit 310. In this case, the processor 340 should receive input from a controller that effects user choices such as disabling or enabling the proximity communications unit 310. Thus, the processor 340 can be detect when the proximity communications unit 310 should be disabled or enabled and responsively disconnect or connect power supply to the proximity communications unit 310.

In an alternative example embodiment, the power saving circuitry is formed of or with an analogue electronics circuitry instead of the A/D converter and processor. The analogue electronics circuitry is configured to sense when commands are issued to the proximity communications unit 310 and to responsively maintain power supply for the proximity communications unit 310 for the activation period. Such an analog electronic circuitry can be formed using normal components and topologies e.g. using one or more capacitors, transistors and resistors for forming a simple delay circuit. The delay circuit can be configured to maintain the controllable switch 340 in conducting state for the activation period and restart the activation period whenever a signal arrives to the proximity communications unit 310.

The apparatus 100 is configured in one example embodiment to switch power on in response to a sufficient voltage forming in the antenna 160. In such an embodiment, the apparatus may be configured to lead the output of the detector 170 to a power switch (not shown) of the apparatus 100, either directly or through further electronics components.

In normal operation of the proximity communications unit 310, voltages are formed in the antenna 160. In case that these voltages could be high enough to potentially cause false detection of the electromagnetic signal 222, the switch 176 can be provided for selectively disabling the detector 170 by opening the switch 176 when false detection would otherwise occur. If the switch 176 is not present, there is a continuous line in its place (considering FIG. 3).

A sample waveform (sinusoidal wave) is drawn as an input from the antenna 160 to the detector 170. After some voltage drop by the diode 172 and possible other parts such as the resistor 176, the amplitude is little lower. Moreover, the diode 172 high-passes only the part of the sample waveform that exceeds its forward bias thus leaving a series of peaks. Thanks to the position of the diode 172, the diode 172 does not prevent normal operation of the proximity communications unit 310. If such a signal is not suited for the shutter I/O implementation, a capacitor can be used to even the output of the detector 170. For example, a capacitor may be connected between ground and the output of detector 170.

FIG. 4 shows some example sequences according to an example embodiment for authorizing transmission of commands from the device 200 to the apparatus 100. The sequences indicate power envelopes that are applied to restrict output signals of the transmitter 220. The actual signal form can have a simple regular waveform e.g. square, triangle or sinusoidal form. In FIG. 4, two sequences on the bottom are varying the amplitude of the electromagnetic signal 222 only between two different levels. For example, the voltages caused in the antenna 160, when the device 200 is attached to the apparatus 100, can vary between 5 and 10 volts. In the two next sequences towards the top of FIG. 4, the amplitude of the electromagnetic signal 222 is varied between three different levels. It should be noticed that the different levels need not be equidistant. One sequence (on top of FIG. 4) is drawn with still lower granularity by following a sinusoidal curve rounded to tenths on scale 0 to 2. The sequence can also be a pure sinusoidal wave without any impulse steps. Authorizing transmission of commands may prevent triggering of unintended events in case interfering signals cause voltage variations in the antenna 160.

While FIG. 3 shows a detector that can detect only the presence of a command or no presence of a command, the shutter input/output 320 can be configured to distinguish a long-lasting electromagnetic signal 222 from a short one and operate e.g. so that when the signal is first received from the detector 170, a photograph is taken with present settings and if the signal continues over a threshold period, the taken photograph is abandoned without necessarily submitting anywhere from the camera circuitry and the autofocus is locked to its present setting. On the other hand, if the detector is configured to distinguish two or more different commands e.g. based on voltage levels, the detector can trigger corresponding different events.

Figure 6:
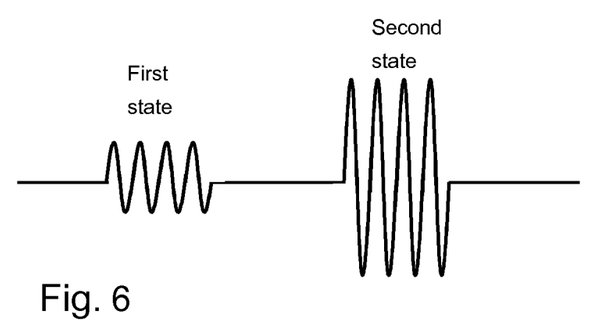
FIGS. 6 and 7 show examples of different states of an electromagnetic signal that is transmitted to an antenna shown according to an example embodiment.
Figure 7:
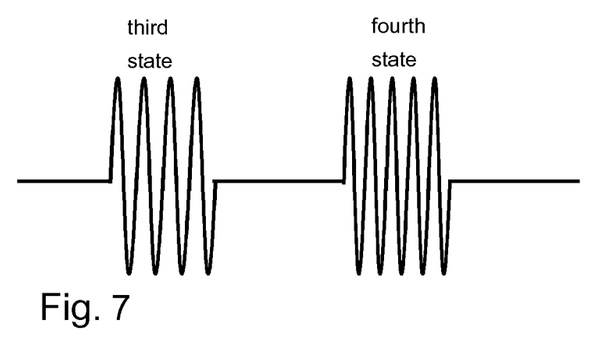

FIG. 6 shows an example of two different states of the electromagnetic signal 222 that correspondingly form different voltages in the antenna 160, here e.g. 5 V and 10 V (peak-to-peak), respectively in a first state and in a second state. In both states, the frequency can be e.g. 13.56 MHz. FIG. 7, on the other hand, shows two different states, third and fourth states, of an electromagnetic signal 222 with differing frequencies. The drawing is such that the second state shows a 20% higher frequency than the first state. Such a difference could also cause that the antenna 160 would receive one of the states with a clearly higher voltage than the other, if the frequency of one states hits closer to a resonant frequency of the antenna 160. On the other hand, the voltage formed in the antenna 160 can also be the same. In one example embodiment, the detector 170 is configured to detect a given electromagnetic signal 222 based on its frequency in addition or instead of its voltage. For this purpose, the detector 170 can be equipped with a frequency modulation detector or a frequency discriminator.

The electromagnetic signal 222 can comprise two or more different parts such as those illustrated by the first to fourth states of FIGS. 6 and 7. Some of the parts may differ by any of amplitude; frequency; and wave form, for example.

For issuing different commands, the user input 210 comprises in one example embodiment more than one button and/or with a multi-way controller such as a wheel or joystick. Moreover, one or more of the buttons can have two different stages of actuation e.g. as known from shutter release buttons of many cameras.

Figure 5:
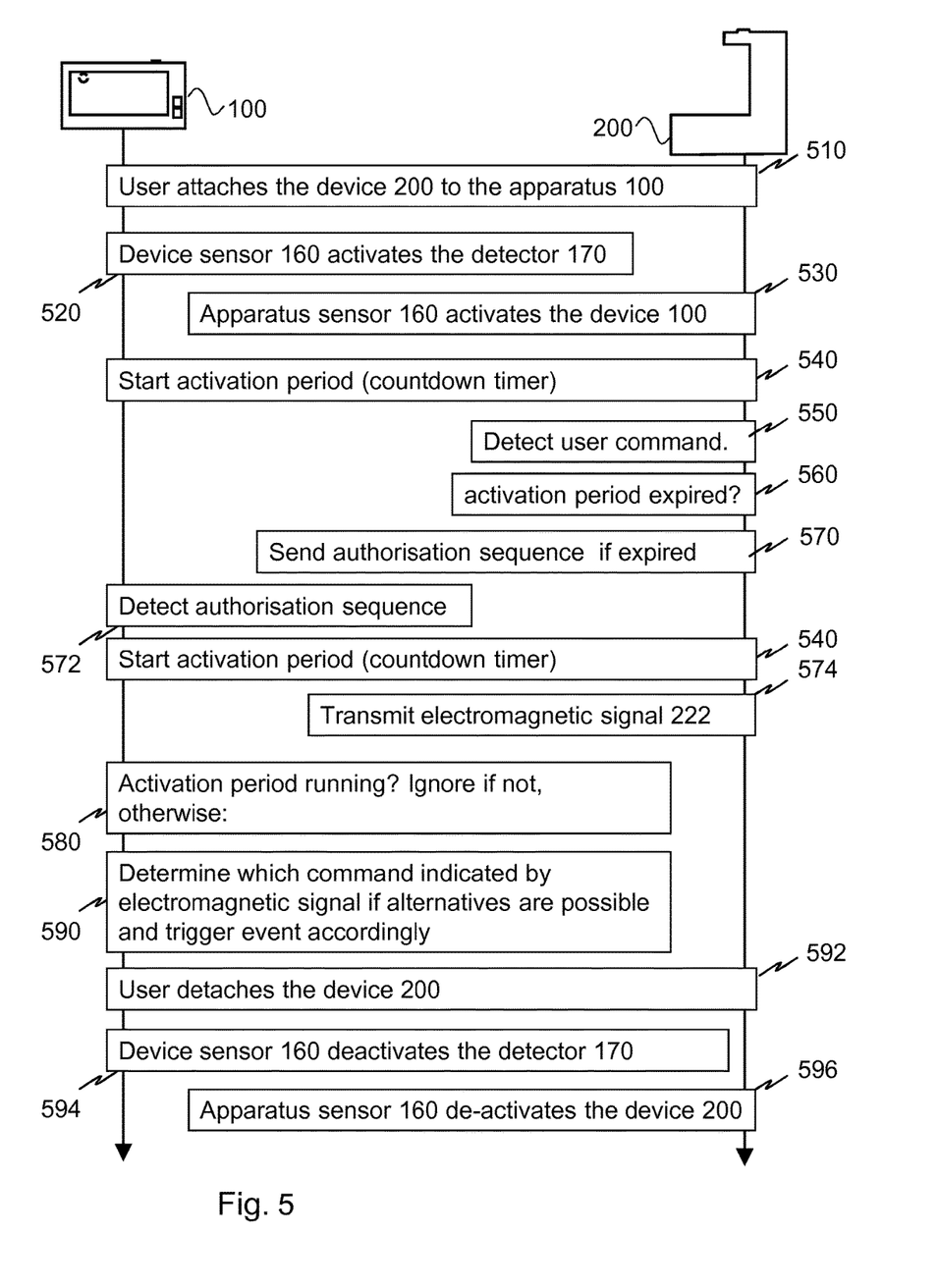
FIG. 5 illustrates a process according to an example embodiment.

FIG. 5 illustrates a process according to an example embodiment. FIG. 5 shows on two adjacent time lines some main events occurring in the apparatus 100 and in the device 200.

In step 510, the user attaches the device 200 to the apparatus 100. The device sensor 160 then activates 520 the detector 170 and the apparatus sensor 160 activates 530 the device 100. An activation period (countdown timer) is started 540 for a session in which commands can be issued from the device 200 to the apparatus 100 wirelessly using the antenna 160 of the proximity communication circuitry of the apparatus 100. Next, the device 200 detects 550 a user command issued with the user input 210. The device 200 then checks 560 if the activation period has expired. If yes, the device 200 sends 570 an authorization sequence and starts 540 activation period (countdown timer). The apparatus 100 detects 572 the authorization sequence 570 and starts monitoring the activation period. In an example embodiment, the apparatus 100 and/or the device 200 are or is configured to account for the slightly differing moments in the activation period by suitably adjusting the expiry time of the activation period.

When the activation period is running and the device 200 has a command to send to the apparatus 100, the device 200 transmits 574 a corresponding electromagnetic signal 222 to the apparatus 100.

The apparatus 100 receives the electromagnetic signal 222 and checks 580 if the activation period is running. If not, then the apparatus rejects or ignores the electromagnetic signal 222, otherwise the apparatus determines 590 the command in question, if there are different alternatives and triggers a corresponding event.

At some point of time, the user detaches 592 the device 200. The device sensor and the apparatus sensor then deactivate the detector 170 and the device 200 in steps 594 and 596, respectively.

Without in any way limiting the scope, interpretation, or application of the claims appearing below, a technical effect of one or more of the example embodiments disclosed herein is commands can be issued to a proximity communication enabled apparatus from an external device through the antenna of a proximity communication circuitry even when the proximity communication circuitry is disabled e.g. by being switched off in part or entirely. Another technical effect of one or more of the example embodiments disclosed herein is that the commands can be issued by very simple external devices as there is no need to modulate or key any information to a radio signal but even a regular waveform can be used to convey an indication of a command. Another technical effect of one or more of the example embodiments disclosed herein is that external control can be provided for devices that cannot receive such control through their normal data communication circuitries such as universal serial bus due to limitations of operating system, for example. Yet another technical effect of one or more of the example embodiments disclosed herein is that the entire apparatus can be powered on by the external device in embodiments in which induced antenna voltage is configured to simulate the effect of a power switch of the apparatus.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

In an example embodiment, there is provided a method and apparatus for wirelessly communicating by a proximity communication circuitry comprising an antenna with a proximate device according to a proximity communication protocol. The proximity circuitry is disabled when not needed. Voltage in the antenna caused by an electromagnetic power signal is detected when the proximity communication circuitry is disabled. The detection of voltage is independent of whether the electromagnetic signal complies with the proximity communication protocol. An event is triggered in response to the detected voltage. Correspondingly, in an example embodiment, there is provided a method and device for externally controlling the apparatus in which a user command is detected and responsively to the user command, an electromagnetic signal is transmitted to the apparatus for triggering the event. The electromagnetic signal has a regular wave form.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
 a proximity communication circuitry comprising an antenna configured to wirelessly communicate with a proximate device according to a proximity communication protocol;
 a power saving circuitry configured to disable the proximity circuitry when not needed;
 a detector configured to detect voltage in the antenna caused by an electromagnetic signal when the proximity communication circuitry is switched off; wherein the detection of voltage is independent of whether the electromagnetic signal complies with the proximity communication protocol; and
 the detector being further configured to trigger an event in response to the detected voltage.

2. The apparatus of claim 1, further comprising a camera unit; wherein the event is issuing a command to the camera unit.

3. The apparatus of claim 2, wherein the command is an auto focus lock command or an imaging command.

4. The apparatus of claim 1, further comprising a camera unit; wherein the event is switching on the camera unit.

5. The apparatus of claim 1, wherein the electromagnetic signal has a regular wave form.

6. The apparatus of claim 1, wherein the detector is further configured to determine from two or more different voltage levels one that corresponds to the detected voltage and the detector is further configured to trigger one of two or more events depending on the determined voltage level.

7. The apparatus of claim 1, wherein the detector is further configured to determine a predetermined sequence of different voltages in the antenna caused by variance in the electromagnetic signal and only in response to the determining of the predetermined sequence to enable the triggering of the event.

8. The apparatus of claim 1, wherein the detector is further configured to detect the frequency of the electromagnetic signal, and to determine from two or more different frequencies one that corresponds to the detected frequency, and wherein the detector is further configured to trigger one of two or more events depending on the determined frequency.

9. The apparatus of claim 6, further comprising a timer configured to disable the triggering of the event after a predetermined activation period of time.

10. A device comprising:
 a user input configured to detect a user command; and a transmitter configured to transmit, responsively to the detecting of the user command by the user input, an electromagnetic signal to a proximity communication circuitry of an external apparatus for triggering an event in the external apparatus via the proximity communication circuitry of the external apparatus;

wherein the electromagnetic signal is not compliant with proximity communications supported by the proximity communication circuitry of the external apparatus.

11. The device of claim 10, further comprising a mechanical connector configured to attach the device to the external apparatus.

12. The device of claim 10, wherein the user input is configured to receive different types of user commands and the transmitter is configured to perform the transmitting of the electromagnetic signal with a power level indicative of the type of the user command in question.

13. The device of claim 10, wherein the user input is configured to receive different types of user commands and the transmitter is configured to perform the transmitting of the electromagnetic signal with a frequency indicative of the type of the user command in question.

14. A method, comprising:
wirelessly communicating by a proximity communication circuitry comprising an antenna with a proximate device according to a proximity communication protocol;
disabling the proximity circuitry when not needed;
detecting voltage in the antenna caused by an electromagnetic signal when the proximity communication circuitry is disabled; wherein
the detection of voltage is independent of whether the electromagnetic signal complies with the proximity communication protocol; and
triggering an event in response to the detected voltage; wherein
the event is issuing a command to a camera unit.

15. The method of claim 14, wherein the command is an auto focus lock command or an imaging command.

16. The method of claim 14 further comprising a camera unit; wherein the event is switching on the camera unit.

17. A method comprising:
detecting a user command; and
transmitting, responsively to the detecting of the user command, an electromagnetic signal to a proximity communication circuitry of an external apparatus for triggering an event in the external apparatus via the proximity communication circuitry of the external apparatus;
wherein the electromagnetic signal is not compliant with proximity communications supported by the proximity communication circuitry of the external apparatus.

18. The method of claim 17, further comprising receiving different types of user commands and transmitting the electromagnetic signal with a power level indicative of the type of the user command in question.

19. The method of claim 17, further comprising receiving different types of user commands and transmitting the electromagnetic signal with a frequency indicative of the type of the user command in question.

20. The device of claim 10, wherein the electromagnetic signal is not compliant with proximity communications supported by any proximity communication circuitry of the external apparatus.

21. The method of claim 17, wherein the electromagnetic signal is not compliant with proximity communications supported by any proximity communication circuitry of the external apparatus.

* * * * *